Oct. 22, 1968     A. SETTLE     3,406,894
CHECK AND ENVELOPE
Filed July 12, 1967
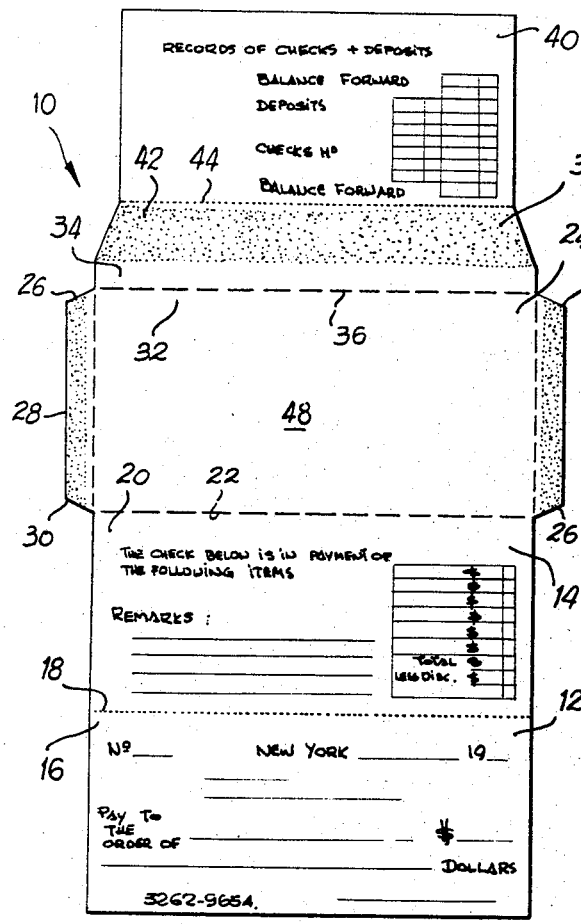
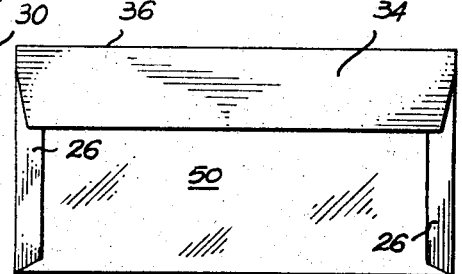
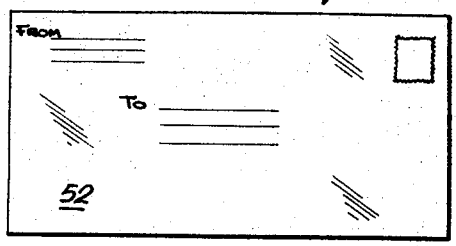
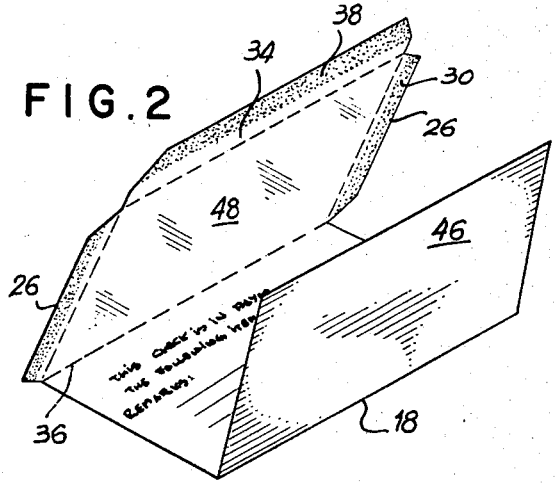
INVENTOR.
AARON SETTLE.
BY
ATTORNEY 3,406,894
CHECK AND ENVELOPE
Aaron Settle, 560 W. Broadway,
Long Beach, N.Y. 11561
Filed July 12, 1967, Ser. No. 652,885
9 Claims. (Cl. 229—70)

ABSTRACT OF THE DISCLOSURE

The present invention relates to a check and envelope combination which has a check section, a recording section, an envelope portion and a check recording stub all on one page. The check and recording sections with the envelope portion are mailed to the payee in the envelope portion, the sender being able to retain his check recording stub.

---

When mailing checks either from businesses or personal matters, utter frustration and a good deal of time wasting has been experienced because of separate bookkeeping as well as records and mailing paraphernalia.

For example, the bookkeeper generally follows the procedure of determining the purpose of the check and recording the same in a separate action, preparing the check, and the check stub, separating the stub from the check, obtaining a mailing envelope in a separate action and addressing the same, and then inserting the check in the envelope and gluing the envelope shut so that it may be deposited in the mail for transmittal to the addressee.

These aforementioned operations are generally separate movements and actions which require excessive time and much duplication of effort. If the records are typed, many times the secretary who prepares these records may make four or five insertions into her typewriter to separately type each individual record, check, check stub and envelope.

Valuable time, energy and money is lost because of these extra and now superfluous motions.

It is the general object of the present invention to avoid and overcome the foregoing and other prior art difficulties by providing a combination check and envelope which make provision for all records on one separable sheet.

Another object of the present invention is to provide a combination check and mailing envelope which is easily separable from the documents normally retained and yet requiring only one sheet of paper.

A further object of the present invention is to permit ease of record keeping for business and personal affairs.

Still another object of the present invention is to provide a fast and efficient means of preparing checks for business and personal affairs which reduces the possibility of lost time and in general facilitates prior time consuming motions.

Yet a further object of the present invention is to permit the preparation of checks and their accompanying records and expedite the mailing of the checks.

The objects of the present invention, and other objects which will become more apparent as the description proceeds are achieved by providing a combination check and envelope comprising a blank check section, a recording section removably connected to said check section, an envelope portion removably connected to said recording section, said envelope portion being provided with a plurality of flaps capable of folding around said recording section, and a check stub recording portion removably connected to said envelope portion, said check recording section, envelope portion and check stub recording portion being provided on a single sheet.

For a better understanding of the present invention, reference should be had to the accompanying drawings where like numerals of reference indicate similar parts throughout the respective views and wherein:

FIGURE 1 is a plan view showing the preferred relationship of the various sections and portions, FIGURE 2 is a perspective view showing the folding of the envelope portion, FIGURE 3 is a view from the front of the sealed envelope, and FIGURE 4 is a view from the rear of the sealed envelope.

Referring now to FIGURE 1, a combination check envelope is shown therein and is generally indicated by the reference numeral 10.

A negotiable instrument such as a check section 12 may be provided, and although in one form in the drawings may take any one of various well known forms. The check 12 may be printed in the particular preferred format of the bank or other institution utilizing my invention.

Removably attached to the check section 12 there may be provided a recording section 14. The recording section 14 may be contiguous with the check section 12 at its upper edge 16 along the perforated line 18 and may be capable of folding back onto the recording section 14. The recording section 14 is provided so that the purpose of the negotiable instrument or check 12 may be recorded in detail.

At the upper edge 20 of the recording section 14 there may be provided a crease 22 which may act as a line of demarcation between the recording section 14 and the envelope portion 24. Extending laterally outwardly from each side of the envelope portion 24 there may be provided a pair of small flaps 26 each of which is capable of folding inwardly. The outer edges 28 of each small flap may be provided with an adhesive material or liquid activating glue 30. At the upper end 32 of the envelope portion 24 there may be provided an elongated flap 34, a crease 36 separating the elongated flap 34 from the envelope portion 24. The elongated flap 34 may be provided with an adhesive or liquid activating glue 38 thereon, the elongated flap 34 being capable of folding along crease 36, downwardly. Structurally the envelope portion 24 is slightly larger than either the check section 12 and the recording section 14 so that if the check and recording sections 12, 14 were folded upwardly against the envelope portion 24, the elongated flap 34 would fold downwardly over them without buckling or bending the envelope portion 24 or the upwardly folded sections.

In order to maintain an accurate account of the check, a check recording stub 40 may be detachably connected to the upper edge 42 of the elongated flap 34. A perforated line 44 separates the check recording stub 40 from the elongated flap 34 so that the stub 40 may be torn from the elongated flap 34, leaving the envelope portion 24, the recording section 14, and check section 12 as a unit.

As clearly shown in FIGURE 1, the check section 12, recording section 14, envelope portion 24, and check recording stub 40 are on one single sheet of paper and that paper is appropriately creased and perforated as described above. A pad of the single sheets may be made so that a multiplicity of check envelopes 10 may be provided.

In describing the use and utility of my invention, it may be seen that the check section 12 may be completed first shown the payee and amount of the check, as any ordinary check would be drawn. The recording section 14 would thereafter be filled in an accordance with good accounting procedures and then the check recording stub 40 would be completed. The envelope portion would then be torn along the perforated line 44 thereby separating the check recording stub 40 and thereby providing a permanent record of the check. As shown in FIGURE 2 the check section 12 would then be folded upwardly along tne perforated line 18 against the recording section 14 and the envelope portion 24 would then be folded downwardly over the check section 12. It may be recognized that the back surface of the check section 46 would then be in contact with the front surface 48. The inwardly folding small flaps 26 would present the adhesive in contacting relation with the back surface 50 of the recording section 14 and so to would the adhesive 38 on the elongated flap 34 be in contact with the back surface 50 of the recording section 14.

As shown in FIGURE 4, the back surface 50 of the recording section 14 will have the small and elongated flaps 26, 34 in sealing contact therewith. The back surface 52 of the envelope portion 24 may be provided with appropriate portions for indicating the address of the person to whom the check is being sent, as shown in FIGURE 3. Alternatively, the envelope portion may be provided with a window-like portion (not shown) so that if the address of the person were provided on the back surface 46 of the check section 12 in alignment with the window-like portion, the back surface 52 of the envelope portion 24 would not have to be addressed.

It will be recognized that the check section 12 therefore is folded between the envelope portion 24 and the recording section 14 so that when the check is received by the payee, it may be torn from the recording section 14 along the perforated line 18 and thereafter negotiated in the manner well known to those skilled in the art.

It will be recognized, in view of the above description, that the objects of the present invention have been achieved by providing a check envelope 10 which eminate from a single sheet of paper, appropriately creased and perforated which will provide an efficient check mailing procedure and permanent record and which permit the saving of time and motion by the person, firm or corporation dispensing the check.

Although a preferred embodiment of the present invention is herein shown and described in detail in accordance with the patent statutes, it is particularly understood that the invention is not limited thereto or thereby.

I claim:

1. A combination check and envelope comprising a check section; a recording section removably connected to said check section; an envelope portion removably connected to said recording section; said envelope portion being provided with a plurality of flaps capable of folding around said recording section; and a check recording stub portion removably connected to said envelope portion; said check section, recording, envelope portion, and check stub recording portion being provided on a single sheet.

2. A combination check and envelope according to claim 1 wherein said envelope portion is provided with a small flap extending laterally from each side thereof and an elongated flap disposed on the upper end of said envelope portion.

3. A combination check and envelope according to claim 2 wherein said small flaps and said elongated flap is provided with adhesives for sealing said envelope portion to said recording section thereby enclosing said check section.

4. A combination check and envelope according to claim 3 wherein said recording section is disposed above said check section and is separated therefrom by a perforated line.

5. A combination check and envelope according to claim 4 wherein said envelope portion is disposed above said recording section and is separated therefrom by a creased line.

6. A combination check and envelope according to claim 5 wherein said check stub recording portion is removably connected above said envelope portion and is separated therefrom by a perforated line running along the upper edge of said elongated flap, said check stub recording portion being removable prior to closing said envelope portion around said check section and said recording section thereby maintaining a permanent record of said check section.

7. A combination check and envelope according to claim 6 wherein said check section folds upwardly against said recording section along said perforated line and said envelope portion folds downwardly over said check section, said small flaps thereafter folding inwardly around said check section and in sealing contact with said recording section and said elongated flap folding downwardly around said check section and in sealing contact with said recording section.

8. A combination check and envelope according to claim 7 wherein said envelope section is provided with back surface upon which the addresses, name and address may be printed upon.

9. A combination check and envelope according to claim 8 where a window-like portion is provided in the envelope portion such that the address of the addressee will show therethrough from the back surface of the check section.

References Cited

UNITED STATES PATENTS

| | | | |
|---|---|---|---|
| 1,424,837 | 8/1922 | Lover | 283—9 |
| 3,104,800 | 9/1963 | Johnson et al. | 229—70 |

DAVID M. BOCKENEK, *Primary Examiner.*

UNITED STATES PATENT OFFICE
CERTIFICATE OF CORRECTION

PATENT NO. : 3,406,894
DATED : October 22, 1968
INVENTOR(S) : AARON SETTLE

It is certified that error appears in the above-identified patent and that said Letters Patent are hereby corrected as shown below:

Cancel address for patentee set forth in patent as issued and substitute the following new address:

3501 NW 47th Avenue

Lauderdale Lakes, Florida 33319

Signed and Sealed this

Twenty-second Day of March 1977

[SEAL]

Attest:

RUTH C. MASON
*Attesting Officer*

C. MARSHALL DANN
*Commissioner of Patents and Trademarks*